(12) United States Patent
Yu et al.

(10) Patent No.: US 6,749,659 B1
(45) Date of Patent: Jun. 15, 2004

(54) CONTROLLED RELEASE RATE FERTILIZERS AND METHODS OF MAKING SAME

(75) Inventors: Zhimin Yu, Calgary (CA); James B. Hyne, Calgary (CA); Mark Ernest Grist, White Rock (CA)

(73) Assignee: Enersul, Inc., Calgary (CA)

( * ) Notice: Subject to any disclaimer, the term of this patent is extended or adjusted under 35 U.S.C. 154(b) by 244 days.

(21) Appl. No.: 09/974,772

(22) Filed: Oct. 9, 2001

(51) Int. Cl.$^7$ .............................. C05C 3/00; C05C 9/00
(52) U.S. Cl. ................. 71/28; 71/32; 71/33; 71/61; 71/64.03; 71/64.11
(58) Field of Search .................. 71/28, 32, 33, 71/61, 64.03, 64.11

(56) References Cited

U.S. PATENT DOCUMENTS

| | | | |
|---|---|---|---|
| 2,702,747 A | | 2/1955 | Studebaker et al. ........... 71/64 |
| 3,903,333 A | * | 9/1975 | Shirley et al. ............... 427/212 |
| 4,032,319 A | * | 6/1977 | Smith et al. ................... 71/34 |
| 4,133,669 A | * | 1/1979 | Caldwell et al. ............... 71/54 |
| 4,394,150 A | * | 7/1983 | Garrison et al. ............... 71/62 |
| H1085 H | * | 8/1992 | Simmons et al. ............... 71/28 |
| 5,439,497 A | * | 8/1995 | Boles ............................ 71/63 |
| 5,749,936 A | * | 5/1998 | Humphries et al. ......... 427/212 |
| 6,210,459 B1 | * | 4/2001 | Sanders ......................... 71/61 |

FOREIGN PATENT DOCUMENTS

CA 613765 1/1961

OTHER PUBLICATIONS

Dell'aglio AND Kordek in "Sulphur 99 Calgary–Alberta" Preprints, Oct. 17–20, 1999, British Sulphur Publishing, pp. 32–40.

Besson, (Sep.–Oct. 1995), Sulphur, "Another approach to S forming", pp. 56–59.

\* cited by examiner

*Primary Examiner*—C. Sayala
(74) *Attorney, Agent, or Firm*—Swanson & Bratschun, L.L.C.

(57) ABSTRACT

A fertilizer granule comprises:
  i) an elemental sulfur and swelling clay matrix, and
  ii) at least one additional fertilizer material incorporated into said matrix.

20 Claims, 4 Drawing Sheets

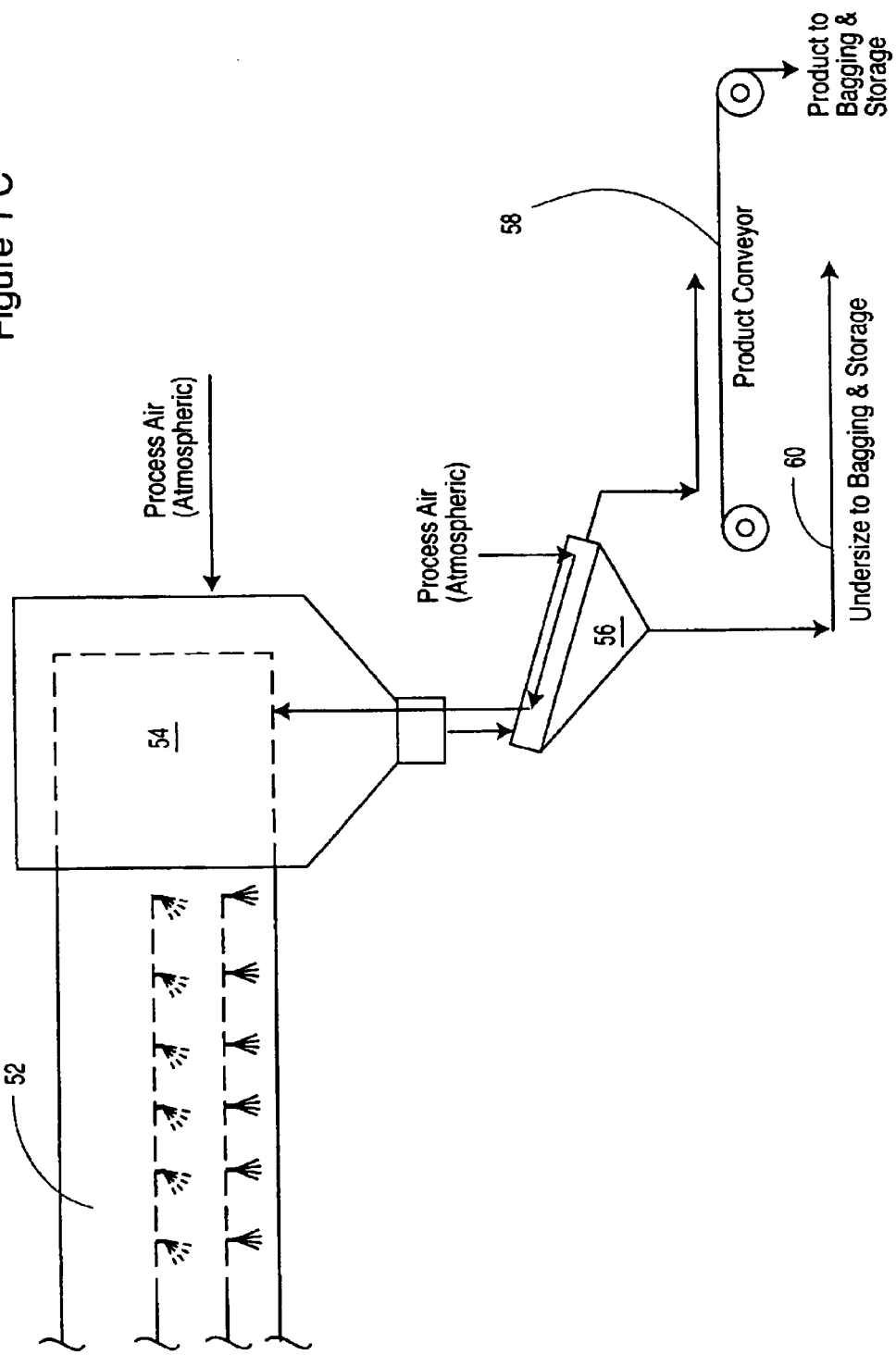

CONTROLLED RELEASE RATE FERTILIZERS AND METHODS OF MAKING SAME

FIELD OF THE INVENTION

The present invention is directed to the field of controlled release rate fertilizers. More particularly, it is directed to the use of a sulfur/clay slurry as a forming agent for fertilizer components, a method of controlling the release of such fertilizer components, and a controlled release form of plant nutrient sulfate.

BACKGROUND OF THE INVENTION

In the agricultural industry, it has long been accepted that it is preferable to apply fertilizer in a granular or pastille form. This has benefits both in terms of storage and in term of dissemination. It has proven difficult, with granulation techniques, however, to provide consistent particles of a uniform size which have specific release characteristics.

Looking firstly at granulation techniques, they can be achieved in various ways. For example, granular fertilizers can be produced through a chemical reaction in which heat is generated to produce granulation of a liquid form fertilizer, such as sulfuric and/or phosphoric acid or ammonia, into a solid form.

The incorporation of clay into fertilizers has long been used for a variety of reasons. For example, Canadian Patent No. 613,765 and U.S. Pat. No. 2,702,747 discuss the use of clay to coat hygroscopic materials such as ammonium sulfate to prevent coalescence of the fertilizer into a solid mass during storage.

U.S. Pat. No. 5,749,936 discloses a process for producing a dry granular fertilizer in which an aqueous slurry comprising clay and a dispersant is mixed with dry minerals or chemicals. The mixture is then fed to a granulator to produce the final product.

While this technology does prevent coalescence of hygroscopic materials and it does have some advantages over the coating technique of previous patents, it does not address another problem that is frequently encountered when using water soluble fertilizers, such as ammonium sulfate. During heavy rainfall or irrigation, water soluble fertilizers may be washed away before they have a chance to be absorbed by the plant. This results not only in a marked loss of efficiency but it also has serious environmental consequences.

The beneficial effects of blending a swelling clay material with liquid elemental sulfur and solidifying to create a controlled release plant nutrient sulfate fertilizer has been used for some time. The presence of the swelling clay in the solid sulfur particle accelerates the breakdown of the solid sulfur into the small particulate size distribution that favours subsequent microbiological conversion of the sulfur to plant nutrient sulfate. Cheap and available elemental sulfur can thus be used to control the rate of release of sulfur into the soil.

Control of the rate of release to the soil of many other forms of applied fertilizer materials has also been recognized to be agronomically important. Such control can minimize loss of water soluble fertilizers as a result of irrigation or heavy rainfall. It can greatly reduce the amount of applied fertilizer material that escapes into the aquasphere causing pollution of waterways. It can improve the uptake of fertilizer plant nutrient material by better timing the release to match plant needs. It can also help keep the fertilizer nutrients in the root growing zone of the soil and minimize sequestration by adsorption at deeper levels where it is unavailable to the plant. In the case of plant micronutrients, controlled release of high analysis fertilizer material prevents the development of toxic concentrations of these materials which are by definition required in very small quantities. Improving the spatial distribution of the micronutrient materials is also a benefit.

Sulfur has been previously used as a control release agent for other fertilizers. Sulfur coated urea (SCU) in various commercial forms is a generic example. There are, however, problems associated with using only elemental sulfur for such purposes. It has proven difficult to control and vary the rate of release. Elemental sulfur coatings may provide incomplete coverage or develop fractures with aging which allows ingress of water and rapid depletion of the carried fertilizer material. Also, a process that depends solely on the degrading of the sulfur by microbiological action to expose the carried fertilizer, is hard to control and is markedly dependent on soil temperature. Formulations that perform well in tropical or subtropical climates may perform poorly in temperate or cool soils. Adjustment of formulations and process conditions to meet these requirements using only elemental sulfur has not been well demonstrated.

Further attempts have been made to supplement sulfur as a control release agent by combining bentonite clays with sulfur to form a sulfur/clay matrix. An example of this composition is described in "Another Approach to S Forming; *Sulfur* September–October 1995" and in "Ground, Degradable Sulfur Granules Suitable for Bulk Blending, *Sulfur* 99, 17–20 Oct. 1999. These articles describe sulfur granules produced in a granulation drum. The control of the granulation step is based on the recycle loop which is fed continuously with ammonium sulfate seed crystals. There is no discussion of the use of additional fertilizer material in this mixture.

SUMMARY OF THE INVENTION

Sulfur, both in its elemental form and as ammonium sulfate, are well recognized as important fertilizer components. However, there can be problems with its efficient delivery to the preferred site of action for the plant. For example, during times of heavy rain, ammonium sulfate may be washed away.

The present invention relates to how a controlled release property can be imparted into a fertilizer formulation by combining the fertilizer material or materials with a coating, carrier matrix or similar component comprising elemental sulfur in admixture with swelling clay(s). A variety of factors including i) the nature of the clay(s), ii) the amount of the clay(s), iii) the process of formulation with the carried fertilizer, and iv) the inclusion of other finely divided materials that can accelerate or decelerate breakdown, can all be adjusted in order to achieve a wide range of release rates.

The invention, in one aspect thereof, relates to the manufacture of a single fertilizer particle that combines a source of both immediately available sulfate and controlled release sulfate that is more resistant to loss by leaching. The invention synergistically combines ammonium sulfate and elemental sulfur components. By doing so, the release of the ammonium sulfate component is slowed down while the release of the elemental sulfur component is simultaneously accelerated by the use of swelling clays. Such a formulation obviates the need for physical blending of differently formulated particles and the undesirable abrasive interaction that can occur between the different components of such blends, often leading to dustiness in the blended product.

According to another aspect the generally spherical form of granulated fertilizer particles also helps to reduce the generation of fines due to abrasive inter particle interaction which, in turn, reduces the amount of such fines being rendered airborne as dust. The formulation can also be extended to include other essential fertilizer materials of both the macronutrient (N,P,K) and micronutrient kind (Fe, Cu, Zn, B, Mn, Mg etc.). The rate of release of these other fertilizers is also subject to the same control mechanism, leading to better distribution in the soil and more efficient and economic use of the fertilizer applied.

The granulation step may be performed by drum/falling curtain granulation, pan granulation, or any similar granulation process in which water is not a major component.

In accordance with another aspect of the invention, the control release rate formulation may be used in fertilizer slurries where the slurry is solidified into fertilizer pastilles on a pastillator machine. This provides an economical manufacture of pastilles with enhanced controlled rate of release features.

In accordance with an aspect of the invention, a fertilizer granule comprises:

i) an elemental sulfur and swelling clay matrix, and ii) at least one additional fertilizer material incorporated into said matrix.

In accordance with another aspect of the invention, a process for the preparation of a controlled release fertilizer particle comprises the steps of:

a) preparing a liquefied mixture of sulfur and a swelling clay;

b) transferring said liquefied mixture to a granulator;

c) adding an additional fertilizer material to said granulator; and d) collecting granules of a predetermined size.

In accordance with a further aspect of the invention, the use of a molten sulfur/clay slurry to prepare a matrix for the delivery of an additional fertilizer material.

In accordance another aspect of the invention, a sulfur-based slurry matrix for slowing down rate of release of an incorporated fertilizer component, said slurry comprises:

i) molten sulfur ii) clay, and iii) ammonium sulfate fines.

In accordance with a further aspect of the invention, the use of the slurry matrix in a pastillator to form fertilizer pastilles is also possible

BRIEF DESCRIPTION OF THE DRAWINGS

Preferred embodiments will be described with respect to the accompanying drawings wherein.

DETAILED DESCRIPTION OF THE PREFERRED EMBODIMENTS

Figure 1:
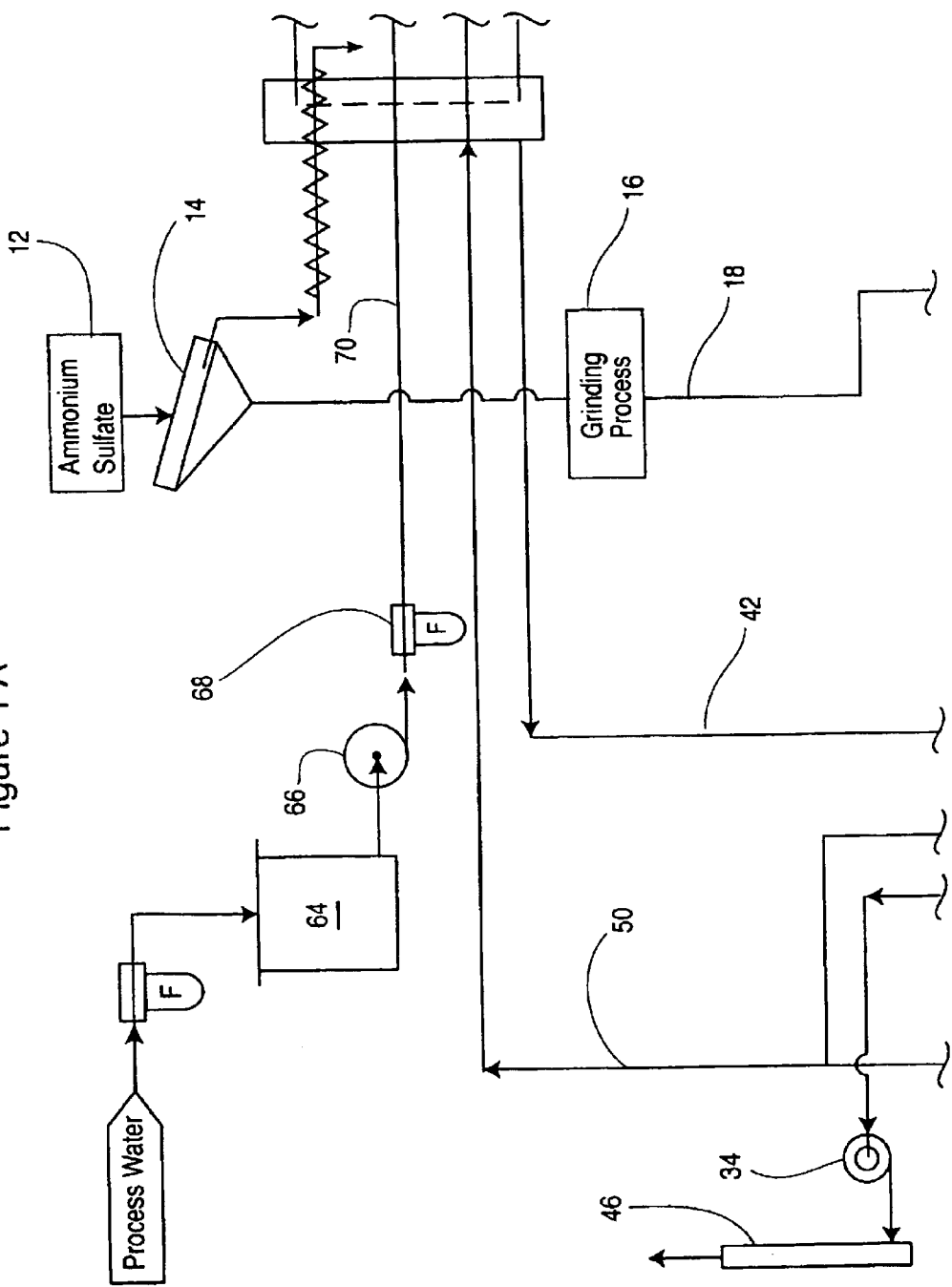
FIG. 1 is a flowchart illustrating a preferred process for preparation of fertilizer particles.
Figure 1:
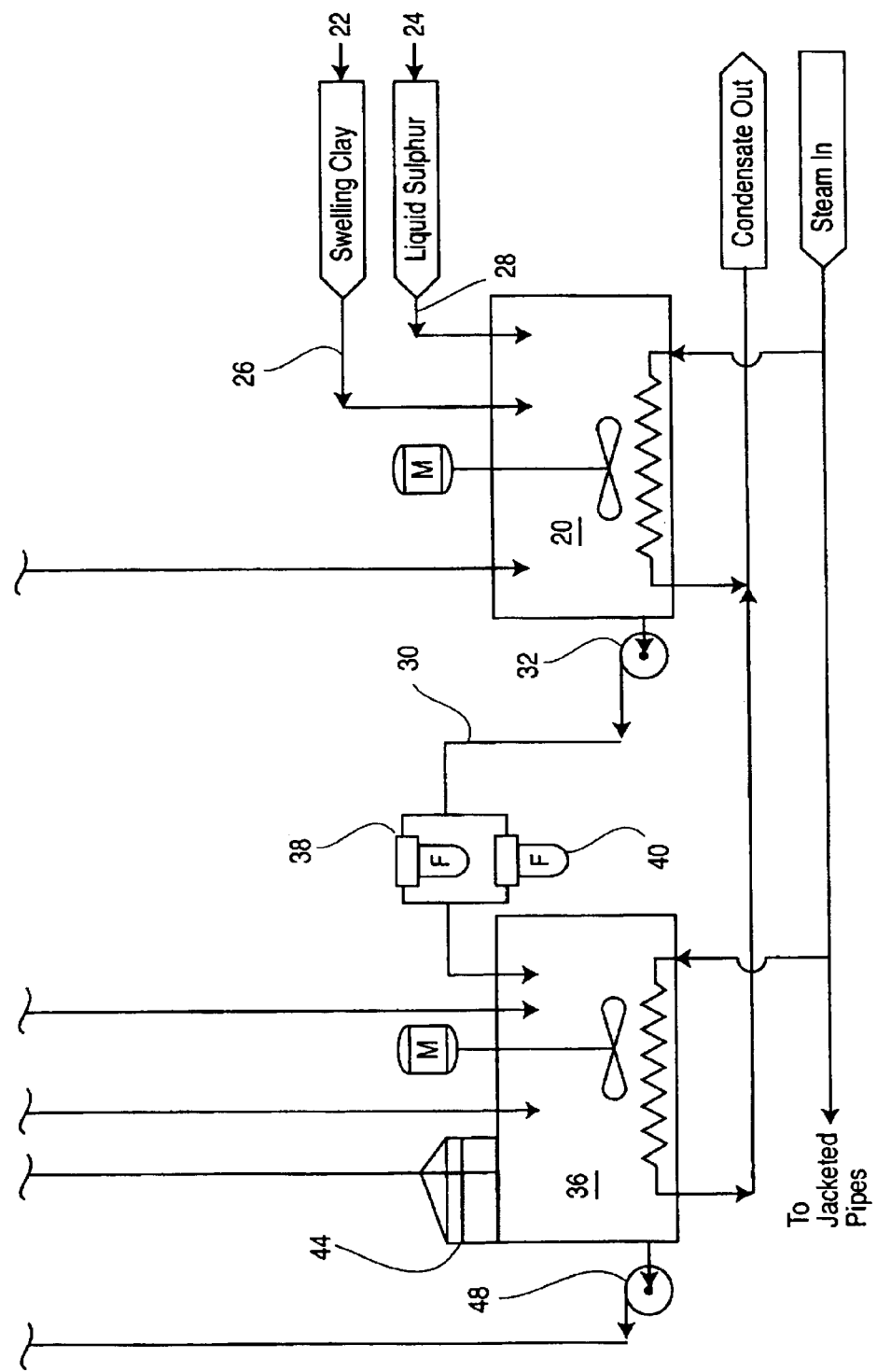

The use of essentially pure elemental sulfur as a coating or matrix to sequester other fertilizer materials, especially water soluble fertilizers such as ammonium salts, urea and potash have been used for some time. Sulfur coated urea is a primary example of such an application. Difficulties, however, have been encountered in ensuring the integrity of the sulfur coating due to the tendency of such coatings to develop cracks after application in the liquid state and solidification. Such cracking has been shown to be due to molecular and crystallographic conversions in the solid state after formation. Sealing the surface of the solid sulfur coating or matrix with a degradable polymer "overcoat" has been successful in some applications but cost and additional processing steps make this solution less attractive. Increasing the thickness of the coating to reduce the chance of too rapid leaching of the water soluble fertilizer materials incorporated in the sulfur has also been tried but it is difficult to control the rate at which the pure elemental sulfur matrix or shell permits withdrawal of incorporated fertilizers in such formulations.

The present invention addresses the problems of the prior art through the combined use of bentonitic swelling clays with elemental sulfur to provide a rate of release control formulation where the rate of degradation of the sulfur matrix can be controlled to provide a measured release of fertilizer materials incorporated in or covered by the formulation. The term, fertilizer materials, is used broadly throughout this specification to include all types of fertilizers, macronutrients and micronutrients. The use of other types of clays that cause swelling and breakdown of the sulfur at a controlled rate in the sulfur formulations containing other plant nutrient and soil conditioning materials are also contemplated by the invention.

In one aspect of the invention, crystalline ammonium sulfate either specifically sized or not, is used as a granulation seed and granulated with a spray application of a liquid release rate control formulation (matrix) containing liquid sulfur with varying amounts of a finely divided selected swelling clay and an additional fertilizer components. The ratio of the sulfur to clay in the matrix may range from about 10 to 1 to about 20 to 1 by weight.

In another aspect of the invention, the sulfur-bentonitic clay formulation may contain varying quantities of finely divided ammonium sulfate fines usually in the range of 5% to 20% of total fertilizer weight. The particle size of the ammonium sulfate fines should be less than 300 microns and preferably less than 150 microns, in order to achieve significant loadings in the sulfur-bentonitic clay formulation without the risk of separation of the suspended solids in the manufacturing process, such as granulating or pastillation processes. As an indicator of the relationship between the amounts of the various components, a formulation may contain about 10% clay and about 10% ammonium sulfate fines in the balance of liquid sulfur. Preferably this release rate control formulation is well mixed and well agitated. High ammonium sulfate fine loading levels have been found to remain as a homogeneous suspension in falling curtain granulation equipment, depending upon other process conditions such as flow rate, use of dispersants etc.

The ammonium sulfate fines are often considered a waste product of the process for preparing specifically sized crystalline ammonium sulfate for agricultural use or from certain processes for cleaning effluent gas streams. Thus, the present invention provides an unexpected upgraded use for such product waste streams and thus contributes to more economical and environmentally friendly industrial operations.

In this aspect of the invention, the process results in a granule containing an ammonium sulfate crystalline core or seed encapsulated in a shell or matrix of sulfur-swelling clay optionally containing ammonium sulfate fine. There are several surprising advantages of this formulation. Firstly, the release of ammonium sulfate when the granule contacts water is much slower than that seen with an elemental sulfur—swelling clay coating containing no ammonium sulfate fines. This result is the opposite to what is expected to happen. Instead, the swelling and breakup of the clay-sulfur matrix is slowed down by the presence of the ammonium sulfate fines. This provides the surprising advantage of a means of controlling the rate of release of both the internal ammonium sulfate and the plant nutrient sulfate carried by the matrix or surrounded by the matrix. The nature of this added and unexpected control mechanism due to the ammonium sulfate fines will vary depending upon the nature of the water soluble additive and the particular chemical structure of the selected clay. This dependence may be a manifestation of the ion exchange processes that might occur between the ions in the clay and the ions in the added water soluble ammonium sulfate fines.

A schematic representation of a process for obtaining the above-described particles is shown in FIG. 1. Ammonium sulfate 12 is dumped onto a vibrating screen 14 which captures the crystalline particles of a desired size and allows the small fines to pass through. The fines, after passing through the grinding process 16, are fed through line 18 to a first heated vessel 20. Swelling clay 22 and molten sulfur 24 are also fed into the vessel 20 through lines 26 and 28, respectively. The fines are mixed with the molten sulfur and clay and the mixture is directed by a pump 32 through line 30 through a filter into a second heated vessel 36. In a preferred embodiment, a dual filter system comprising two alternating filters, 38, 40 is used, in which one filter is rejuvenated while the other filter is being used. Recycled slurry and exhaust process air may also be fed into this tank through line 42, as discussed further below. Vapor from the second heated vessel 36 exits through a port 44 and is pumped by a pump 34 to a vapor treatment device 46 before being released. From the second heated vessel 36, the slurry is pumped by a pump 48 through line 50 to a granulator 52.

The sized ammonium sulfate seed crystals for the granulator are of a preferred size greater than about 1.4 mm and preferably in the range of about 1.7 mm to about 4.00 mm. The sized ammonium sulfate seeds remaining on the vibrating screen are also fed to the granulator 52 where they are granulated with the molten sulfur/clay slurry from line 50. The resulting particles are dried in a dryer 54 and are then fed to another vibrating screen 56. The appropriately sized particles are sent to the product conveyor 58 for bagging and storing. The undersized particles 60 may also be collected and bagged. The sulfur/clay slurry can be recycled through line 42 to the second heated vessel 36 where it is mixed with fresh sulfur/clay from the first heated vessel 20. Process water from a holding tank 64 is pumped by a pump 66 through a filter 68 along line 70 to the granulator 52.

In a preferred embodiment, the clay particle size is not greater than 200 mesh in order to ensure a stable suspension of the clay in the liquid sulfur during the process time prior to solidification.

Adequate stirring/agitation in the clay/sulfur formulation tank is provided to maintain a homogeneous suspension. The transfer line from the reservoir to the granulation drum nozzle is preferably as short as possible and has as few obstructions/changes in direction as possible in order to minimize the chance of deposition of canted clay or other insoluble in the formulation.

The granulation process may be of the drum/falling curtain type or pan granulation or any similar type of granulating process that does not involve the use of significant amounts of water. The use of water is preferably minimized, although the process can accommodate up to 1% of overall processed weight, since water is the "trigger" for the activation of the swelling action of the clay that initiates the breakdown of the sulfur matrix and the controlled release of any incorporated water soluble fertilizer.

Accurate control of temperature parameters throughout the process provides for the production of an acceptable quality product. Due to the polymerization characteristics of liquid sulfur, a liquid sulfur formulation that is too hot becomes highly viscous and prevents adequate spray dispersal from the spray nozzle. This results in inadequate coverage of the ammonium sulfate crystalline material. On the other hand, if the liquid sulfur formulation exiting the spray nozzle is too cool, the spray droplets that impact the ammonium sulfate crystals solidify immediately upon impact, thus forming a rough coating that produces dust on abrasion.

The temperature of the ammonium sulfate crystal bed is also controlled. If the bed is too cool, the liquid sulfur formulation impacting the surface of the ammonium sulfate crystals solidifies too rapidly and prevents the formation of a smooth dust free coating. If the bed is too hot, there is no adequate heat sink available to remove the heat from the applied liquid sulfur formulation to cause solidification before the particles collide in the bed. This causes agglomeration of the sulfur coated particles and creation of oversized particles.

In a preferred embodiment the process temperatures at various points in the system are controlled as follows:

| | |
|---|---|
| Liquid sulfur/clay formulation reservoir | 130–150° C. |
| Heated transfer line reservoir to granulator | 130–150° C. |
| Spray nozzle tip | 130–150° C. |
| Fertilizer (AS) bed | 20–90° C. |
| Granulating drum | 20–90° C. |

The temperatures of the fertilizer (AS) bed and the granulating drum are preferred to be set at the high ends of the suggested ranges when the finely dispersed ammonium sulfate or other powder materials are mixed in the sprayed material.

The nature of the spray nozzle and the spray pattern in the granulating drum are also important factors. A fan type spray has been found to produce good results with a fairly large spray orifice to prevent nozzle clogging.

Equally important to the establishment and maintenance of an adequate spray pattern is the design and function of the spray nozzle, The orifice size should not be less than 4 times the diameter of the largest insoluble particulate carried in the liquid sulfur formulation feed stream.

In another aspect of the invention a significant portion of the feed ammonium sulfate may comprise smaller sized material, that is fines (<300 micron). When the feed material consists of such small particles the granulation process is operated to produce granules which are agglomerations of the ammonium sulfate feed in a sulfur/bentonite matrix. In this embodiment the granules that are produced are comparable in size to the granules based on larger single crystals but contain several smaller crystals of ammonium sulfate in the matrix.

The granulation process is capable of both coating single large seed crystals of ammonium sulfate or agglomerating the smaller ammonium sulfate crystals into comparable sized particles that meet the particle size specifications for bulk blendable fertilizers. The target specification for a good quality bulk blendable fertilizer product is a SGN of 260 with an index of uniformity of at least 60%. The principle advantage of this feature is that it enables the process to accept a wide size distribution on the incoming ammonium sulfate seed material without size classification or pretreatment, although fines in the seed material should be minimized. Particles grown to desired size under either the coating or agglomeration approach will both still retain the controlled release characteristics.

Changes in porosity, permeability and ion exchange (type and concentration of added ammonium sulfate fines) thus provide yet another tool for controlling the rate of release or such other incorporated fertilizer materials. Bearing in mind the growing importance of controlling losses of applied fertilizer to the environment, these surprising results obtained by relatively straightforward modifications of the formulation can be important in responding to the varying nutrient requirements of soils and crops.

Figure 2:
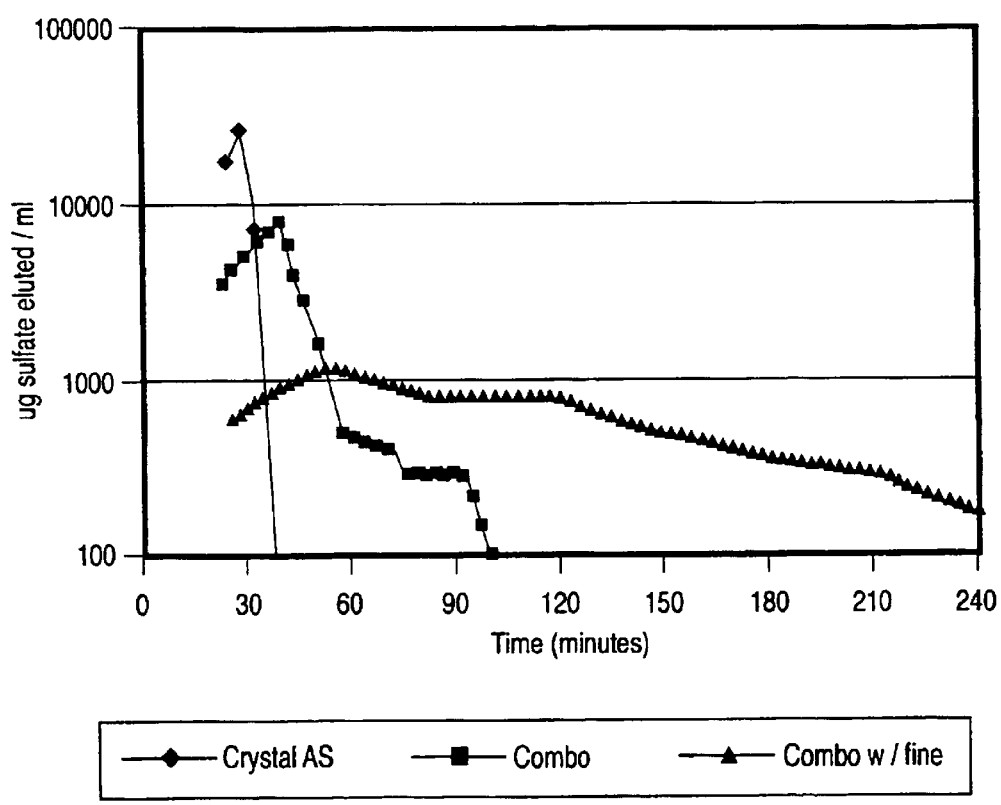
FIG. 2 is a graph illustrating rates of release of ammonium sulfate from various types fertilizer granules.

As shown in FIG. 2 various factors affect the rate of release. FIG. 2 illustrates the relative release rates of ammonium sulfate from various formulations prepared according to the present invention as well as an ammonium sulfate crystal control. The rates of release of ammonium sulfate crystal, ammonium sulfate crystal coated with sulfur/bentonite clay matrix (combo) and ammonium sulfate crystal coated with sulfur/bentonite clay matrix with ammonium sulfate fines (combo with fines) were compared. The various formulations were tested in a standard lysimeter. It is generally appreciated that a lysimeter apparatus does not precisely simulate conditions in field soil. The relative results of the test would, however, be predictive of what would happen in field soil. Using the lysimeter, the rate of release of incorporated water soluble ammonium sulfate is determined by leaching. With reference to FIG. 2, the crystals of ammonium sulfate were quickly leached in the lysimeter in about 30 minutes. The combo formulation, in accordance with a first aspect of the invention, greatly delayed rate of leaching or release. The leaching was delayed until about 90 minutes or more, which is about a threefold increase. The combo product with fines, in accordance with a second aspect of this invention, increased the delay in rate of release well beyond 240 minutes where the rate of release never exceeded about 1000 mg of ammonium sulfate per mil of leaching liquid. As previously mentioned, this control on the rate of release of water soluble ammonium sulfate is quite surprising, It was to be expected that the presence of the ammonium sulfate fines would actually increase the rate of release, not decrease the rate. As a result, the invention greatly reduces losses of fertilizer to the environment and instead enhances the action on the plants. The unexpected slowing effect of the ammonium sulfate fines on release rates can be exploited in several different ways. By altering the ammonium sulfate fine loading level in the sulfur/bentonite clay matrix, the degree of slowing the rate of release may be varied. The less ammonium sulfate fines used the less the delay and hence the faster rate of release. These formulations provide the agronomist with a very valuable tool for adjusting the rate of release of incorporated nutrients to the soil and hence the plant system.

In developing fertilizer formulations that rely in whole or in part on a microbiological process for release of plant nutrient sulfates, the components of the formulation should be non-toxic to the bacteria. The formulations disclosed in this invention have been tested to ensure that they do not impair the microbiological conversion of the elemental sulfur to plant nutrient sulfate.

Another factor in making the formulation which may impact on release rate is that ammonium sulfate can impair the ability of the bentonitic clays to absorb moisture and swell if the ammonium sulfate is left in the molten sulfur/bentonite slurry for an extended period of time, a further delay in release rate can be experienced. Therefore, care should be taken in the process to note the time frame between addition of the ammonium sulfate fines to the slurry and solidification of the slurry.

The present invention can also be applied to other fertilizer materials which function as the crystal seed. In particular urea and potash crystal seeds can be granulated with the sulfur/swelling clay formulation matrix by coating these materials, fed as a seed to the granulation process. The precise composition of the clay/sulfur formulation will control the rate at which the incorporated urea or potash is released as in the case of ammonium sulfate crystal. Furthermore, potash fines or other ionic fines which function like the ammonium sulfate fines, either specifically generated or obtained as a residue from commercial crystallization processes, can be incorporated into the clay/sulfur matrix.

In a further aspect of the present invention, the sulfur-swelling clay matrix, with or without added ammonium sulfate fines, can be used as a matrix for the controlled release of soluble phosphate fertilizer materials, e.g. superphosphates. In this application there is an added benefit in assisting in the plant availability of the phosphate. The elemental sulfur, which results from the swelling clay breaking down the sulfur matrix, is oxidized by soil bacteria to sulfuric acid which changes the acidity (pH) of the soil environment in a direction that favors the solubilization of the phosphate form and the conversion of oxides to sulfates. This benefit can be of greatest value in basic calcareous soils where the phosphate may be sequestered in a less soluble chemical form. Thus, not only does the presence of elemental sulfur in the swelling clay/sulfur formulation control the rate of release of the incorporated phosphorous, but it also has the surprising effect of adjusting soil pH to values that favor the plant availability of the phosphorous.

The incorporation of phosphate into the sulfur-clay matrix can also have a beneficial effect on the rate of microbiological oxidation. The bacteria involved in the oxidation of sulfur to sulfate require a source of phosphorous in their metabolism. Providing such a phosphorous source directly in the fertilizer granule makes it more easily and readily available to the bacteria attached to the surface of the sulfur on which they are feeding rather than be dependent upon more dispersed sources of phosphate in the soils.

In a more particular application of this teaching, the incorporation of about two percent by weight of phosphate into the sulfur-clay formulation could provide a useful and effective source of phosphate for bacterial metabolism although any amount of phosphate provided in this way for this purpose would be beneficial.

In a further extension of the concept of providing nutrients for the bacterial process in the sulfur-clay matrix, the critical role of fixed nitrogen in that metabolism can be considered. The use of an additional ingredient containing both nitrogen and phosphorous may be considered. The commonly used fertilizer diammonium phosphate (DAP) commends itself in this regard. In using this source of phosphorous and nitrogen, however, attention must be paid to the possible ion exchange effects of the ammonium ion on the swelling properties of the sulfur-clay component as discussed earlier. If it is desirable not to impose this ammonium ion exchange effect on the overall properties of the formulation, a phosphate source such as triple super phosphate can be used to provide an effective source of phosphate nutrient for the bacterial metabolism.

In yet a further aspect of the invention, the teachings described above may be applied to the controlled release of micronutrient fertilizer materials such as iron, copper, zinc, boron, manganese, and others.

A major challenge in the application of micronutrients to soil is to ensure that there is a homogeneous distribution of the very small amounts of such materials. In many instances a few ounces/acre (grams per hectare) may satisfy plant requirements. Yet, in some cases there are toxicity levels for such nutrients that must not be exceeded e.g. selenium. Avoidance of "hot spots" in soils due to non-uniform distribution is an important feature of soil management.

These limitations require that attention be paid to the formulation of the micronutrient fertilizer and its method of application. Relatively cheap and readily available elemental sulfur is an excellent "bulking agent" for such micronutrients. When the sulfur is formulated with swelling clay, the bulking properties of the sulfur and the controlled rate of its breakdown and release of contained micronutrient are both obtained as benefits.

By way of example, a micronutrient formulation using copper as the micronutrient can be prepared according to the following example. A source of copper oxide, appropriately free of undesirable heavy metal contaminants, can be ground to a fine powder (−200 mesh) and blended into a liquefied mixture of elemental sulfur and swelling clay. A 10% clay and 90% sulfur blend can carry up to 20% finely divided copper oxide powder when certain blending procedures are followed. If the amount of clay used is reduced, which slows the breakdown rate, a corresponding larger loading of the copper oxide micronutrient may be achievable.

Similar micronutrient sulfur/clay blends can be prepared with other micronutrients. In the case of zinc oxide, micronutrient loadings in excess of 18% actual zinc can be attained using the 10% clay and 90% sulfur matrix and in the case of manganese oxide loading of 17% actual manganese can be achieved. Again these loadings may be increased if the amount of clay, in the matrix formulation can be reduced without reducing the rate of breakdown and release.

The granulating process, in accordance with an aspect of the invention, can be applied in preparing these micronutrient formulations using a variety of seed materials These can range from fines of the micronutrient formulation itself, through other minor fertilizer materials such as urea, ammonium sulfate, potash or various phosphate forms. From the teachings described herein, it is clearly apparent that a single micronutrient, or a mixture of micronutrients may be formulated into a time release controlled granule of nitrogen, phosphorous or potash (NPK) fertilizers.

It has also been shown that pastillation techniques (otherwise known as drop forming techniques) can be used to form hemispherical pastilles of the micronutrient formulations. These products can contain similar amounts of clay and micronutrient to that described above for the products of granulation. In all particle forming technologies that may be used the key factors are (1) the efficiency of the mixing and blending of the clay and the micronutrient and (2) ensuring that the blended formulation of sulfur remains a stable suspension through the forming process until the liquid sulfur suspension is solidified into the particulate form. In particulate forming processes where the liquid blend is passed through orifices to form droplets, it is important that these orifices be of appropriate dimension to avoid bridging or plugging with particles of the suspended clay or added micronutrient as the liquid formulation flows through the orifices. Depending on the specific feed materials involved, and especially their particle size, it may be necessary to sacrifice some of the loading capacity in order to ensure production of a uniform sized and shaped product.

A further preferred embodiment of these teachings, that utilises pastillation technology, incorporates the unexpected benefits of adding ammonium sulfate or other water soluble ionic fines material to pastilles formed from swelling bentonitic clays and elemental sulfur. By virtue of the nature of the pastillation process it is not readily possible to form the pastille around a central crystalline core of another fertilizer material, as has been described above. Therefore, any other fertilizer material in the formulation must be incorporated into the liquid slurry of elemental sulfur and bentonitic swelling clay that is fed to the pastillating machine for solidification into hemispherical pastilles.

It has been shown that the unexpected controlling effect of ammonium sulfate fines on the breakdown rate of the clay/sulfur matrix is still operative in such a pastille even when there is no central seed crystal in the formulation.

The limiting factor in such an embodiment of these teachings is the amount of added fines that can be carried in suspension in the clay/sulfur liquid slurry fed to the pastillation process. In the specific case of ammonium sulfate fines an upper limit of about 50% by weight may be encountered for ammonium sulfate as finely divided as 150 microns or less. Even if homogeneous suspension can be achieved, the thickness or consistency of the liquid slurry feed to the pastillator may be such as to preclude adequate flow through the piping and orifice systems of the pastillating equipment.

Nonetheless, a loading level of 50% by weight or less for ammonium sulphate, together with other water soluble fertilizer material incorporated into the formulation, may be adequate for many components of fertilizer formulations.

This may be especially the case with micronutrients where amounts required are not great but homogeneous distribution in the field in a rate controlled manner is important. These features are an essential and unexpected consequence of addition of the ammonium sulfate fines to the clay/sulfur matrix due to the ion exchange phenomena discussed earlier.

The formulations containing micronutrients may be based on the use of the oxide form of the micronutrient species e.g. ZnO, CuO, MnO etc. Release of these finely divided oxide materials from the sulfur/clay granule, pastille or other particle form is controlled by the swelling action breakdown of the incorporated clay. The released oxide forms, however, are not readily soluble in the soil environment and their up-take by the plant system is often dependent on actual plant root contact with the released oxide particle. It is for this reason that oxy-sulfate or sulfate forms of the micronutrients are preferred. These more soluble and thus more plant available forms are used in micronutrient fertilizer programs but are more expensive and less readily available.

A surprising advantage of the micronutrient/swelling clay/sulfur formulations described here is that, in addition to the swelling clay/sulfur matrix acting as a bulking agent and as a rate of release control mechanism, the sulfur component can undergo microbiological oxidation in the soil (thiobacillus thiooxidans) to produce sulfuric acid. This oxidative process occurs simultaneously with the breakdown of the clay/sulfur matrix and the release of the micronutrient oxide material. The acid and the oxide are in close proximity, having both originated from the same particle source, and effective chemical reaction between the two occurs to produce an oxy-sulfate mix or even complete conversion to the highly plant available pure sulfate form of the micronutrient. The applied oxide form of the micronutrient is thus naturally converted into the more desirable oxy-sulfate form.

To demonstrate this further benefit of the micronunient/swelling clay/sulfur formulation, a copper/swelling clay/sulfur formulation was exposed in a flask to water (triggering the swelling and breakdown action) and in another flask to an aqueous-based environment containing Thiobacillus thiooxidans bacteria that are ubiquitous in soils. After a few days the development of the characteristic blue color of copper sulfate was apparent in the flask containing the bacteria and chemical analysis shows that soluble copper ions are present in the bacterial system (from the formed copper sulfate). The flask with just water remained clear which indicates copper was not oxidized to copper sulfate.

These results demonstrate that, in addition to other benefits, the micronutrient formulations in clay/sulfur also convert "in-situ" in the soil to the desirable and plant available sulfate form of the micronutrients.

Another factor that is an important influence on the rate of release of the fertilizer material is the size of the granule. Thus the size of the granule can be varied to achieve a desired rate of release. As would be understood by those skilled in the art, the rate of release of ammonium sulfate decreases as the particles get larger. For example, particles of about 1 to 2 mm have a rate of volume at least double the rate of release of the 2 to 4 mm particle.

In accordance with a preferred aspect of the invention, the use of ammonium sulfate fines or other ionic fines which function in a similar manner to the ammonium sulfate fines would have been expected to speed up release of the ammonium sulfate. The expected speed up of release rate should have been due to the break down of the clay/sulfur matrix by the dissolution of the ammonium sulfate which, in turn, would allow easier ingress of water into the swelling clay of the matrix and speed up the mechanism of rupture of the coating. Quite surprisingly, this does not happen and although the mechanism is not readily understood, it is thought that there is an ion exchange occurring between the ammonium sulfate in the matrix and the ions, likely calcium, in the clay. This ionic exchange is thought to slow down possibly the swelling of the clay more than compensating for the break down due to dissolution of ammonium sulfate fines near the surface of the matrix. This unexpected rate affect of the ion exchange mechanism appears to remain operative even when the central crystalline seed of the ammonium sulfate is removed; that is, in the pastilles and only ammonium sulfate fines are incorporated in the clay/sulfur matrix. Should the pastille formulation contain other soil/plant nutrients, such as micro-nutrients, their release from the pastille will also be rate controlled in a manner that can be adjusted by changing the amount of ammonium sulfate fines incorporated in the clay/sulfur slurry feed to the pastillator.

The environmental and economic benefits of this invention in being able to fine tune the rate of release of fertilizer nutrient components in the formulation is very significant. There is considerable concern about the amount of water soluble chemical fertilizers that do not find their way to the growing plant, but are lost to the aqueous environment by leaching before the plant root system can assimilate them. It has been estimated that in many climatic zones as little as 40% of the applied water fertilizer is actually of benefit to the plant, while the remaining 60% is lost to the environment. Economically, this means that much of the farming revenues are being spent on buying fertilizer that provides no return on crop yield and has the undesirable negative effect on environmental quality.

Although preferred aspects of the invention are described with respect to the drawings, it is understood that variations made be made thereto without departing from the spirit of the invention or the scope of the appended claims.

What is claimed is:

1. A controlled release fertilizer granule comprising:
   i) an elemental sulfur and swelling clay matrix; and
   ii) at least one additional fertilizer material dispersed into said matrix.

2. The fertilizer granule of claim 1, wherein said additional fertilizer material is selected from the group consisting of ammonium sulfate, urea, potash, ammonium, phosphate and micronutrient fertilizers.

3. The fertilizer granule of claim 1, further comprising a fertilizer core surrounded by said matrix.

4. The fertilizer granule of claim 3, wherein said fertilizer core comprises an ammonium sulfate crystal.

5. The fertilizer granule of claim 1 wherein said additional fertilizer material comprises ammonium sulfate fines.

6. The fertilizer granule of claim 2, wherein said micronutrient fertilizers comprise a material selected from the group consisting of iron, copper, zinc, boron, manganese and their oxy-sulfate, sulfate and oxide forms.

7. The fertilizer granule of claim 1 wherein said matrix comprises a sulfur to clay ratio of about 10 to 1 to about 20 to 1 by weight.

8. A process for the preparation of a controlled release fertilizer particle comprising the steps of:
   a) preparing a liquefied mixture of sulfur and a swelling clay;
   b) blending an additional fertilizer material into said liquefied mixture;
   c) transferring said liquefied mixture to a granulator;
   d) adding an additional fertilizer material for coating with said liquefied mixture thereby forming coated granules; and
   e) collecting said coated granules of a predetermined size.

9. The process of claim 8, wherein said granulator is a falling curtain type of granulator.

10. A method of using a molten sulfur/clay slurry to prepare a matrix for the delivery of an additional fertilizer material, said method comprising the steps of:
    a) preparing a liquefied mixture of sulfur and a swelling clay;
    b) dispersing an additional fertilizer material into said liquefied mixture.

11. The method according to claim 10, wherein said additional fertilizer material is ammonium sulfate fines.

12. A sulfur-based slurry matrix for slowing down rate of release of an incorporated fertilizer component, said slurry comprising:
    i) molten sulfur
    ii) clay, and
    iii) ammonium sulfate fines.

13. A method of using a sulfur-based slurry matrix to prepare a slow release fertilizer product, said method comprising the steps of:

a) preparing a slurry of molten sulfur and a swelling clay;

b) adding to said slurry ammonium sulfate fines.

14. The slurry matrix of claim 12 wherein said ammonium sulfate fines have an average particle size of less than about 300 microns.

15. The slurry matrix of claim 14 wherein said average particle size is less than about 150 microns.

16. The slurry matrix of claim 14 comprising up to about 50% by weight of said fines.

17. The slurry matrix of claim 12 comprising a sulfur to clay ratio of about 10 to 1 to about 20 to 1 by weight.

18. A method of using a sulfur-based slurry matrix in a pastillator to form fertilizer pastilles, said method comprising the steps of:

a) preparing a slurry of molten sulfur and a swelling clay;

b) dispersing into said slurry ammonium sulfate fines;

c) delivering said slurry containing ammonium sulfate fines to a pastillator for formation of fertilizer pastilles.

19. The slurry matrix of claim 12 incorporating ammonium sulfate as said fertilizer component.

20. A method of using a sulfur-based slurry matrix in a falling curtain granulating drum to form fertilizer granules, said method comprising the steps of:

a) preparing a slurry of molten sulfur and a swelling clay;

b) dispersing into said slurry ammonium sulfate fines;

c) delivering said slurry containing ammonium sulfate fines to a falling curtain granulating drum for formation of fertilizer granules.

\* \* \* \* \*